(12) United States Patent
Lee et al.

(10) Patent No.: US 11,128,324 B2
(45) Date of Patent: Sep. 21, 2021

(54) 5G COMMON FILTER WITH EXCELLENT PIMD PERFORMANCE USING COUPLING METHOD UPON COMBINING FREQUENCY BANDS AND FILTERING METHOD THEREWITH

(71) Applicant: ERANGTEK, Suwon-si (KR)

(72) Inventors: Jae Bok Lee, Hwaseong-si (KR); Young Nam Ji, Anyang-si (KR)

(73) Assignee: ERANGTEK, Suwon-si (KR)

( * ) Notice: Subject to any disclaimer, the term of this patent is extended or adjusted under 35 U.S.C. 154(b) by 0 days.

(21) Appl. No.: 17/108,792

(22) Filed: Dec. 1, 2020

(65) Prior Publication Data

US 2021/0184703 A1 Jun. 17, 2021

(30) Foreign Application Priority Data

Dec. 17, 2019 (KR) ........................ 10-2019-0168653

(51) Int. Cl.
*H04L 5/12* (2006.01)
*H04L 23/02* (2006.01)
*H04B 1/00* (2006.01)

(52) U.S. Cl.
CPC ........... *H04B 1/006* (2013.01); *H04B 1/0078* (2013.01); *H04B 1/0082* (2013.01)

(58) Field of Classification Search
CPC ..... H04B 1/006; H04B 1/0082; H04B 1/0078

USPC ........................................................ 375/262
See application file for complete search history.

(56) References Cited

U.S. PATENT DOCUMENTS

| 2015/0381243 | A1* | 12/2015 | Park | H04B 1/40 370/338 |
| 2019/0027432 | A1* | 1/2019 | Dalmia | H01L 24/13 |
| 2019/0140364 | A1* | 5/2019 | Mirmozafari | H01Q 21/24 |
| 2019/0288719 | A1* | 9/2019 | Bai | H04B 1/0064 |

FOREIGN PATENT DOCUMENTS

KR 10-2018-0064054 A 6/2018

* cited by examiner

*Primary Examiner* — Tanmay K Shah
(74) *Attorney, Agent, or Firm* — Novick, Kim & Lee, PLLC; Jae Youn Kim

(57) ABSTRACT

Proposed is a 5G common filter with excellent PIMD performance using a coupling method upon combining frequency bands and a filtering method therewith that are capable of combining outputs of multiple carriers into one and transmitting it to an antenna by improving PIMD performance and are capable of improving PIMD performance of common couplers by changing coupling methods depending on frequency band signals of multiple carriers including 5G. The 5G common filter with excellent PIMD performance using a coupling method upon combining frequency bands in accordance with the present invention comprises a first coupler for combining a first band signal and a second band signal; and a second coupler for combining output of the first coupler and a third band signal.

14 Claims, 6 Drawing Sheets

5G COMMON FILTER WITH EXCELLENT PIMD PERFORMANCE USING COUPLING METHOD UPON COMBINING FREQUENCY BANDS AND FILTERING METHOD THEREWITH

FIELD OF THE INVENTION

The present invention relates to a 5G-common filter with excellent PIMD performance using a coupling method upon combining frequency bands and a filtering method therewith; and more particularly to, a common coupler for reducing PIMD interference generated by a band coupler for combining outputs of multiple carriers including 5G into one and transmitting it to an antenna. In other words, the present invention relates to the 5G-common filter with excellent PIMD performance using the coupling method upon combining frequency bands and the filtering method therewith to improve performance by reducing PIMD interference by varying coupling methods depending on frequency bands with multiple high-power signals.

BACKGROUND OF THE INVENTION

Recently, due to the appearance of smart phones, announcement of carriers' unlimited data plans, etc., the demand on wireless Internet is on increase. In particular, 5G adoption leads the implementation of a network of new frequency bands.

As such, as the demand on mobile communications is continuously on increase, the quality of mobile communications is required. Couplers, which integrate several mobile communication systems into one to use one common antenna, cause an issue of passive intermodulation distortion (PIMD) that has been almost ignored in the commercial mobile communication system for a while. This issue becomes more serious due to multi-channelization, high voltage, high frequency, etc. to solve the request for improvement of the quality of mobile communications. To solve the issue, continuous studies have been made.

As an example, Korean Patent Laid-Open Patent No. 10-2018-0064054 proposed a suspended structure of a floating PCB that implements a wideband diplexer by using a low-pass filter and a high-pass filter and minimizes the tunneling effect as a main cause of occurrence of PIMD of nonlinear contact to improve performance.

However, even in this case, it is difficult to combine signals of the near frequency band.

DETAILED EXPLANATION OF THE INVENTION

Technical Problem

The object of the present invention is to provide a 5G common filter with excellent PIMD performance using a coupling method upon combining frequency bands and a filtering method therewith capable of combining outputs of multiple carriers to an antenna by improving PIMD performance.

The other object of the present invention is to provide a 5G common filter with excellent PIMD performance using a coupling method upon combining frequency bands and a filtering method therewith capable of improving PIMD performance of common couplers by changing methods of combining outputs depending on signals of frequency bands of multiple carriers including 5G.

Means for Solving the Problem

A 5G common filter with excellent PIMD performance using a coupling method upon combining frequency bands in accordance with the present invention may include a first coupler for combining a first band signal and a second band signal combines and a second coupler for combining output of the first coupler and a third band signal.

Herein, if a frequency interval between the first band signal and the second band signal is a specified value or less, the first coupler may be constructed for combining them with common poles and the second coupler may be constructed therefor with striplines.

In addition, if a frequency interval between the first band signal and the second band signal exceeds the specified value, the first coupler may be constructed for combining them with striplines and the second coupler may be constructed with common poles.

Herein, the common poles may be capacitors for combining at least two frequency band signals.

Besides, the common poles may be formed with a frequency resonator to which frequency band signals flow; a signals-connecting wall where the multiple frequency band signals are combined; and a connecting unit to which signals combined at the signals-connecting wall are transmitted to an antenna.

Furthermore, the signals-connecting wall may be formed with a base for connecting the frequency resonator and the connecting unit; and an upper extending portion which is configured extended to the upper side of the base and is placed at a distance from the frequency resonator and at a distance from the connecting unit.

Additionally, the signals-connecting wall may perform impedance matching for the frequency band signals based on height H, width W and separation distance d of the upper extending portion.

Meanwhile, the striplines may be used on a PCB pattern for combining at least two frequency band signals.

A 5G common filter with excellent PIMD performance using a coupling method upon combining frequency bands in accordance with another example embodiment of the present invention may comprise: a band divider for dividing a frequency band serviced by at least one carrier, which is lower than a first specified value, into a low frequency band, dividing a frequency band between the first specified value and a second specified value into a medium frequency band and dividing a frequency band which is higher than the second specified value into a high frequency band; a channel filter for filtering out channels for output of the band divider; a first coupler 100 for combining two or more low frequencies with common poles for output of the channel filter; a second coupler 200 for combining two or more medium frequencies with common poles for output of the channel filter; a third coupler for combining two or more high frequencies with common poles for output of the channel filter; and a fourth coupler for combining the outputs of the first, second and third couplers with striplines for combining.

At the time, the common poles may be capacitors for combining at least two frequency band signals.

In addition, the common poles may be formed with a frequency resonator to which frequency band signals flow; a signals-connecting wall where the multiple frequency band signals are combined; and a connecting unit to which signals combined at the signals-connecting wall are transmitted to an antenna.

Furthermore, the signals-connecting wall may be formed with a base for connecting the frequency resonator and the connecting unit; and an upper extending portion which is configured extended to the upper side of the base and is placed at a distance from the frequency resonator and at a distance from the connecting unit.

Moreover, the signals-connecting wall may perform impedance matching for the frequency band signals based on height H, width W and separation distance d of the upper extending portion.

Meanwhile, the striplines may be used on a PCB pattern for combining at least two frequency band signals.

A 5G common filtering method with excellent PIMD performance upon combining frequency bands in accordance with a third example embodiment of the present invention may comprise steps of: combining a first band signal and a second band signal in a first coupler; and combining output of the first band coupler and a third band signal in a second coupler; wherein, if a frequency interval between the first band signal and the second band signal exceeds a specified value, the first coupler is constructed with striplines and the second coupler is constructed with common poles; and wherein, if a frequency interval between the first band signal and the second band signal is less than the specified value, the first coupler is constructed with common poles and the second coupler is constructed with striplines.

Effects of the Invention

A 5G common filter with excellent PIMD performance using a coupling method upon combining frequency bands and a filtering method therewith in accordance with the present invention have an advantage of transmitting combined outputs of multiple carriers to an antenna by improving PIMD performance.

Besides, the filter and the filtering method in accordance with the present invention has the other advantage of being capable of improving PIMD performance of common couplers by changing coupling methods depending on frequency band signals of multiple carriers including 5G.

DETAILED DESCRIPTION OF THE PREFERRED EMBODIMENTS

Detailed example embodiments to implement the present invention will be explained below by referring to attached drawings.

In this specification, there may be a variety of modifications and several example embodiments. Specific example embodiments will be exemplified in drawings and detailed explanation will be made. They are not intended to limit the present invention. In this specification, it may be understood that they include all changes, equivalents and substitutes within the scope of technical thoughts of the present invention.

Below explanation on a 5G common filter with excellent PIMD performance using a coupling method upon combining frequency bands and a filtering method therewith in accordance with the present invention will be made in details by referring to attached drawings.

Figure 1:
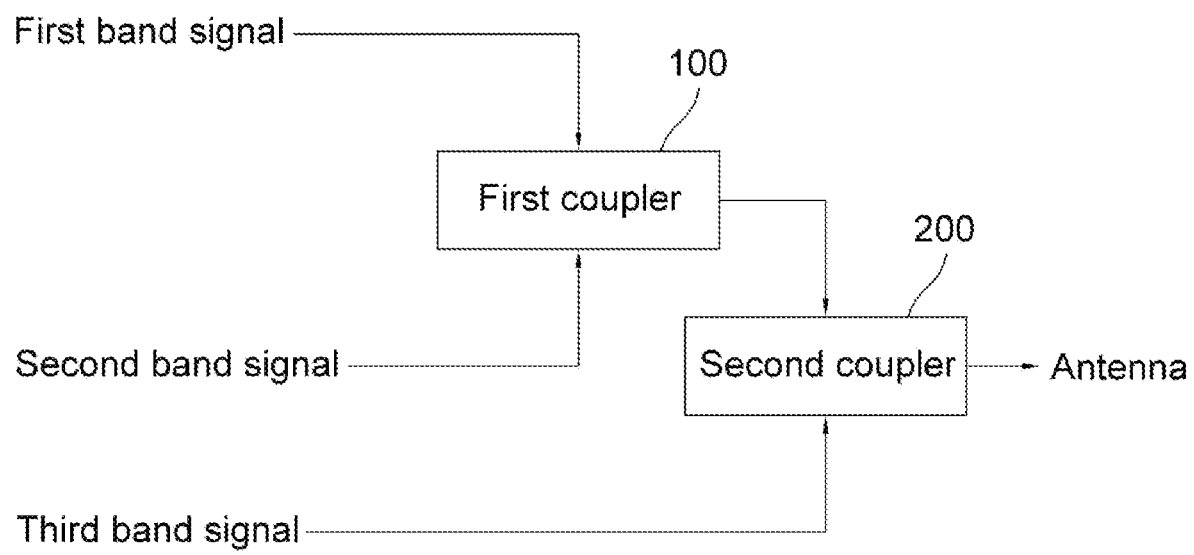
FIG. 1 is a block diagram illustrating a 5G common filter with excellent PIMD performance using a coupling method upon combining frequency bands in accordance with one example embodiment of the present invention.
Figure 2:
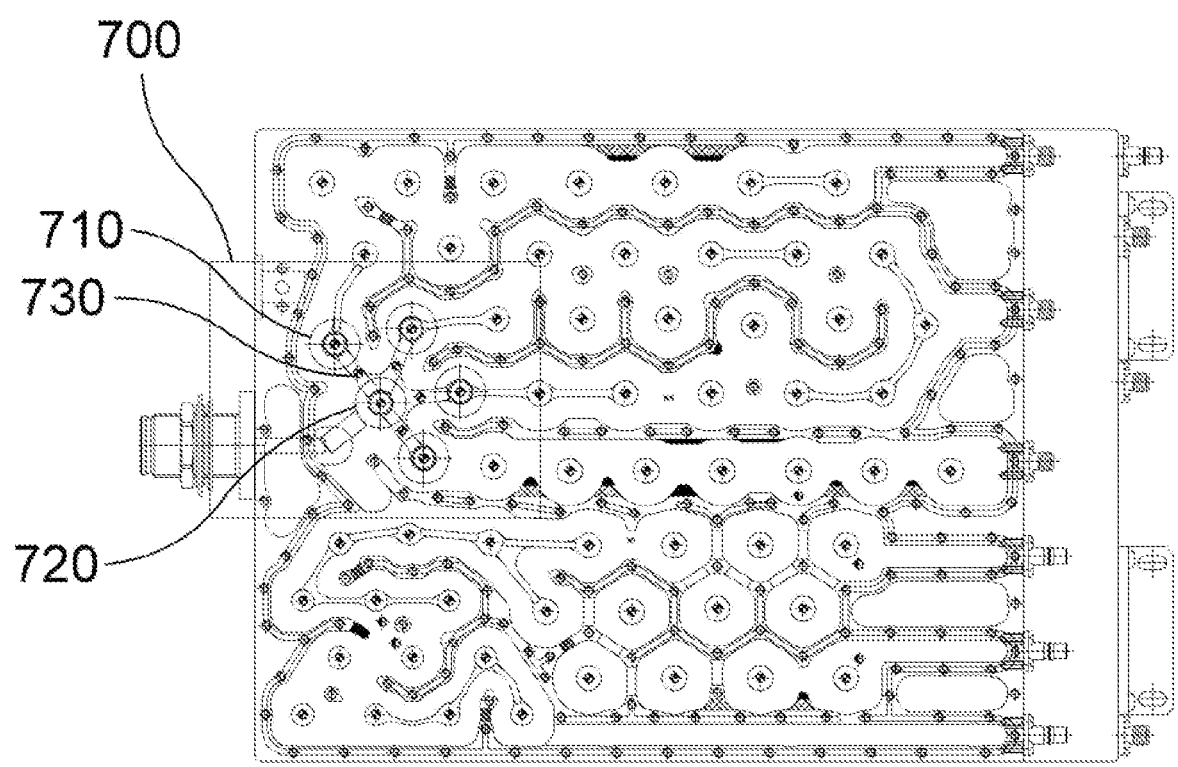
FIG. 2 is a detailed drawing representing a method of allowing a first coupler 100 or a second coupler 200 illustrated in FIG. 1 to use common poles.
Figure 3A:
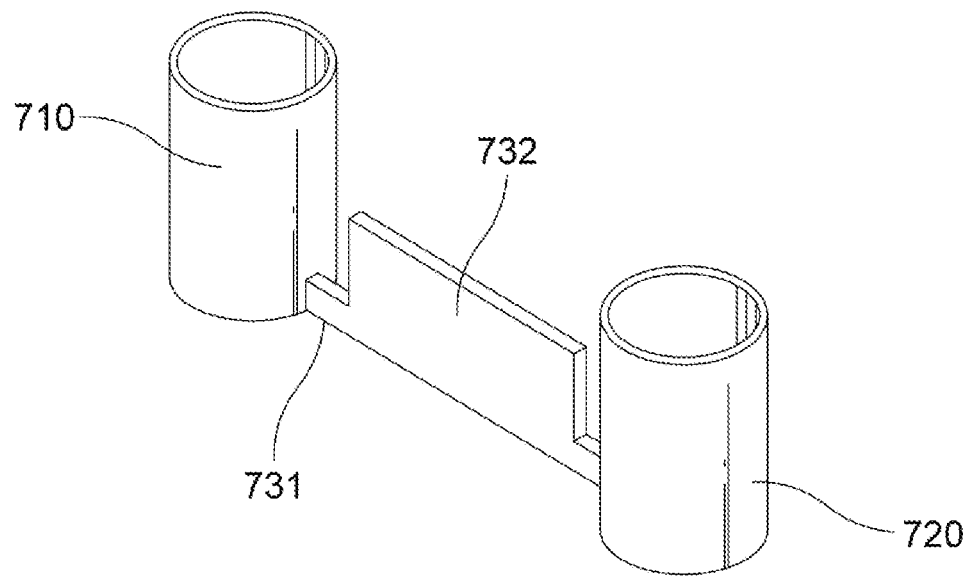
FIGS. 3A and 3B show a perspective drawing and a cross-sectional diagram.
Figure 3B:
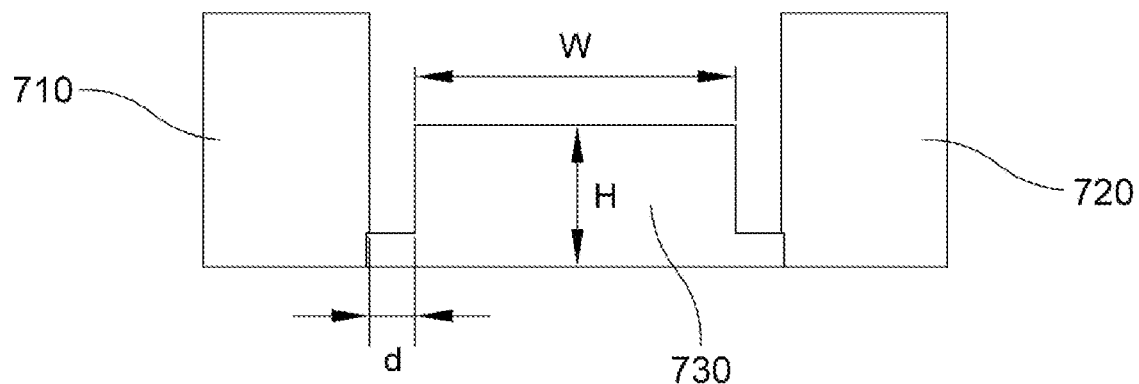
Figure 4:
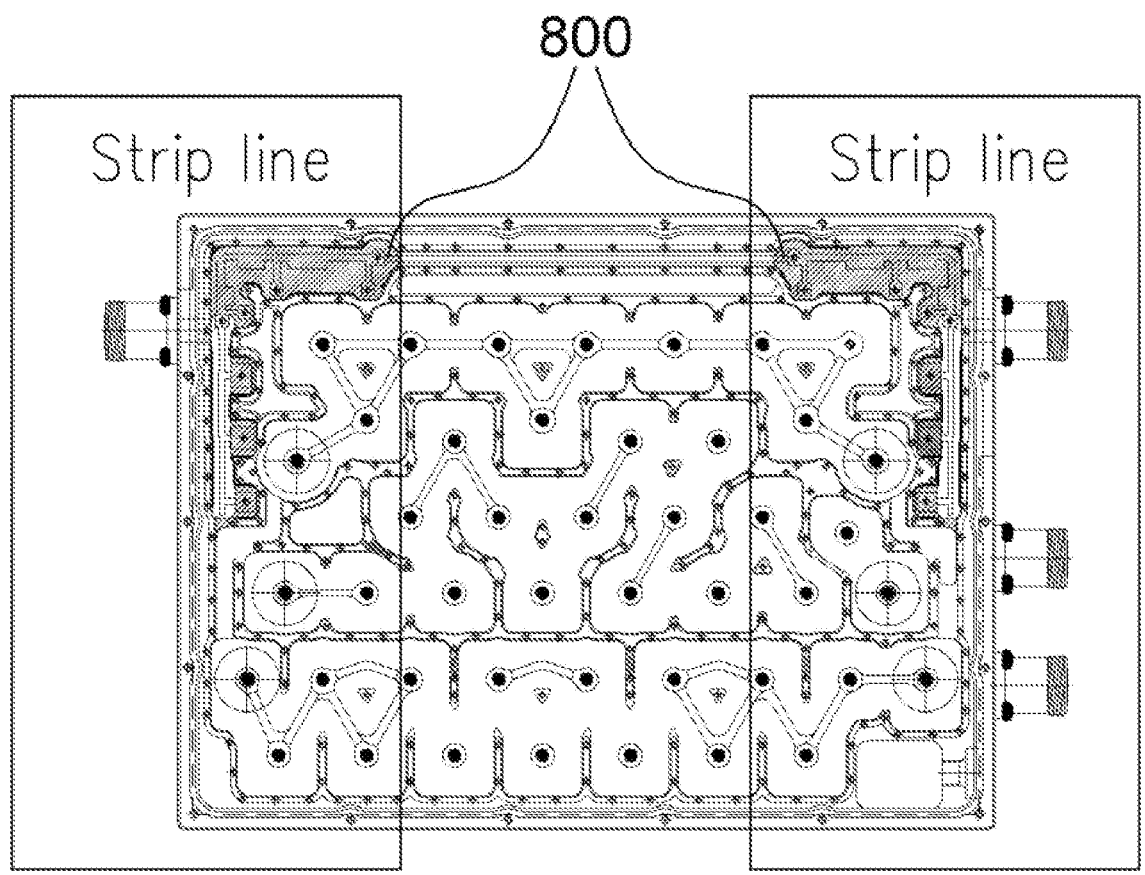
FIG. 4 is a detailed diagram representing a method of allowing the first coupler or the second coupler in FIG. 1 to use striplines.

FIG. 1 is a block diagram illustrating a 5G common filter with excellent PIMD performance using a coupling method upon combining frequency bands in accordance with one example embodiment of the present invention and FIGS. 2 through 4 are detailed drawings to explain FIG. 1.

By referring to FIGS. 1 through 4, the filter in accordance with one example embodiment of the present invention will be explained.

First of all, by referring to FIG. 1, the filter in accordance with one example embodiment of the present invention is composed of a first coupler 100 for combining a first band signal with a second band signal; and a second coupler 200 for combining output of the first coupler 100 with a third band signal.

Herein, if a frequency interval between the first band signal and the second band signal is a specified value or less, the first coupler 100 is constructed with common poles and the second coupler 200 is constructed with striplines.

Besides, if a frequency interval between the first band signal and the second band signal exceeds the specified value, the first coupler 100 is constructed with striplines and the second coupler 200 is constructed with common poles.

In the present invention, to solve a problem of causing interference between carriers arising from PIMD when different adjacent signals are band-combined, a common pole method is used.

To transmit frequencies of multiple carriers with different frequency bands such as 800 MHz, 900 Mhz, 1.8 GHz, 2.1 GHz, 3.5 GHz, etc. including 5G to one antenna, band combining is required for the outputs from base stations or repeaters of carriers.

At the time, frequencies of multiple carriers sometimes may be adjacent to each other or sometimes may not. In particular, when different adjacent signals are band-combined, this may cause PIMD, which may create interference between carriers. In the present invention, to solve such problem, the performance of PIMD between different adjacent frequency bands may be improved by using a common pole method.

While the common pole method has a disadvantage of taking a lot of space to implement, a stripline coupling method is to couple striplines simply on a Printed Circuit Board (PCB). Therefore, the latter method shows poor performance of PIMD between different adjacent frequency bands but takes less space.

In case of the stripline coupling method, the occurrence of PIMD between different frequency bands, if they are by more than a specified value as far as each other, may be ignored. Therefore, it is more effective to use striplines for combining different frequency band signals if they are by more than a specified value as far as each other.

Accordingly, the present invention has an effect of improving the PIMD performance while saving space by using band-coupling methods which are mixed with the common pole method if a frequency interval between the first band signal and the second band signal is the specified value or less and the stripline coupling method if a frequency interval between the first band signal and the second band signal exceeds the specified value.

FIG. 2 is a detailed drawing representing a method of allowing the first coupler 100 or the second coupler 200 in FIG. 1 to use common poles.

As shown in FIG. 2, the common poles may be capacitors for combining at least two frequency band signals.

Herein, multiple frequency band signals are channel-filtered by multiple cavities and the result is combined at a band combining unit 700.

The band combining unit 700 is formed with a signals-connecting wall 730 extended in a radial shape from a common pole-shaped connecting unit 720 for connecting signals to one antenna. The signals-connecting walls 730 are formed to correspond to the number of frequency resonators 710, being extended to insides of the cavities located in the ends of channel filters and finally being connected to inputs of multiple frequency band signals.

In other words, the band combining unit 700 in the present invention uses capacitors for combining multiple channel-filtered signals (C coupling) instead of using antennas. This has an advantage of showing excellent PIMD performance and also overcoming a shortcoming that complicated tuning is required for combining them by using antennas (L coupling).

FIGS. 3A and 3B shows a perspective drawing and a cross-sectional diagram of the band combining unit 700 in FIG. 2.

As shown in FIGS. 3A and 3B, the common poles in the present invention may allow frequency band signals to flow to frequency resonators 710 and allow multiple frequency band signals in the signals-connecting wall 730 to be combined to the connecting unit 720 and thereby transmitted to an antenna.

Herein, the band combining unit 700 is composed of the frequency resonator 710, the connecting unit 720 and the signals-connecting wall 730. Besides, the signals-connecting wall 730 may be composed of a base 731 for connecting the frequency resonator 710 and the connecting unit 720; and an upper extending portion 732 which is configured extended to the upper side of the base 731 and is placed at a distance from the frequency resonator 710 and at a distance from the connecting unit 720.

In other words, as illustrated in FIG. 3A, one end of the signals-connecting wall 730 is connected to the connecting unit 720 of the band combining unit 700 through the base 731 formed on the bottom side of the signals-connecting wall 730 and the other side is connected to the frequency resonator 710 by being extended to the inner sides of the cavities at the ends of individual channel filters.

As seen in FIG. 3B, the signals-connecting wall 730 in the aforementioned configuration may perform impedance matching for the frequency band signals based on height H, width W and separation distance d of the upper extending portion 732. Accordingly, the height H, width W and separation distance d of the upper extending portion 732 may be adjusted to perform appropriate impedance matching with received and transmitted frequency bands.

Accordingly, in accordance with the present invention, even without coupling lines which couple striplines with each other as shown in the existing method, a variety of the frequency bands though individual channel filters are connected to the band combining unit 700 after impedance matching by the signals-connecting wall 730 and therefore, high power signals may be transmitted through one antenna and even frequencies received through the antenna may be outputted via the channel filters to accessing ports.

In addition, as part of the signals-connecting wall 730 of the band combining unit 700 is extended in a radial shape inside of cavities on the end, the band combining unit 700 may be very excellent in space utilization and be monolithic upon injection molding.

As shown above, in accordance with the present invention, the frequencies inputted to the band combining unit 700 through the individual channel filters are combined and transmitted through one antenna and the frequencies received through the antenna are connected to the individual channel filters through the band combining unit 700. This has a structure of bidirectional transmission and reception.

Meanwhile, to minimize losses of signals transmitted via the individual channel filters to the band combining unit 700 or received to the antenna and then connected to the individual channel filters through the band combining unit 700, outer surfaces of the connecting unit 720 and the signals-connecting wall 730 may be plated with a conductive material. More desirably, it may be plated with silver as an excellent conductive material. At the time, the silver plating may be formed with thickness between 6 µm and 15 µm.

FIG. 4 is a detailed diagram representing a method of allowing the first coupler 100 or the second coupler 200 in FIG. 1 to use striplines.

As seen in FIG. 4, striplines may be formed on a PCB for combining at least two frequency band signals and multiple input signals may be connected at the time on the PCB composed of one stripline 800 and due to the multiple inputs, interferences occur between inputs and these may result in PIMD.

However, if the difference between frequency bands of multiple input signals exceeds a specified value, the PIMD-creating frequencies are not generated to adjacent frequencies. Therefore, there could be no interference between multiple input signals. Accordingly, if the difference between frequency bands of the multiple input signals exceeds the specified value, striplines may be used for combining the signals and this may improve PIMD performance and use smaller space.

Figure 5:
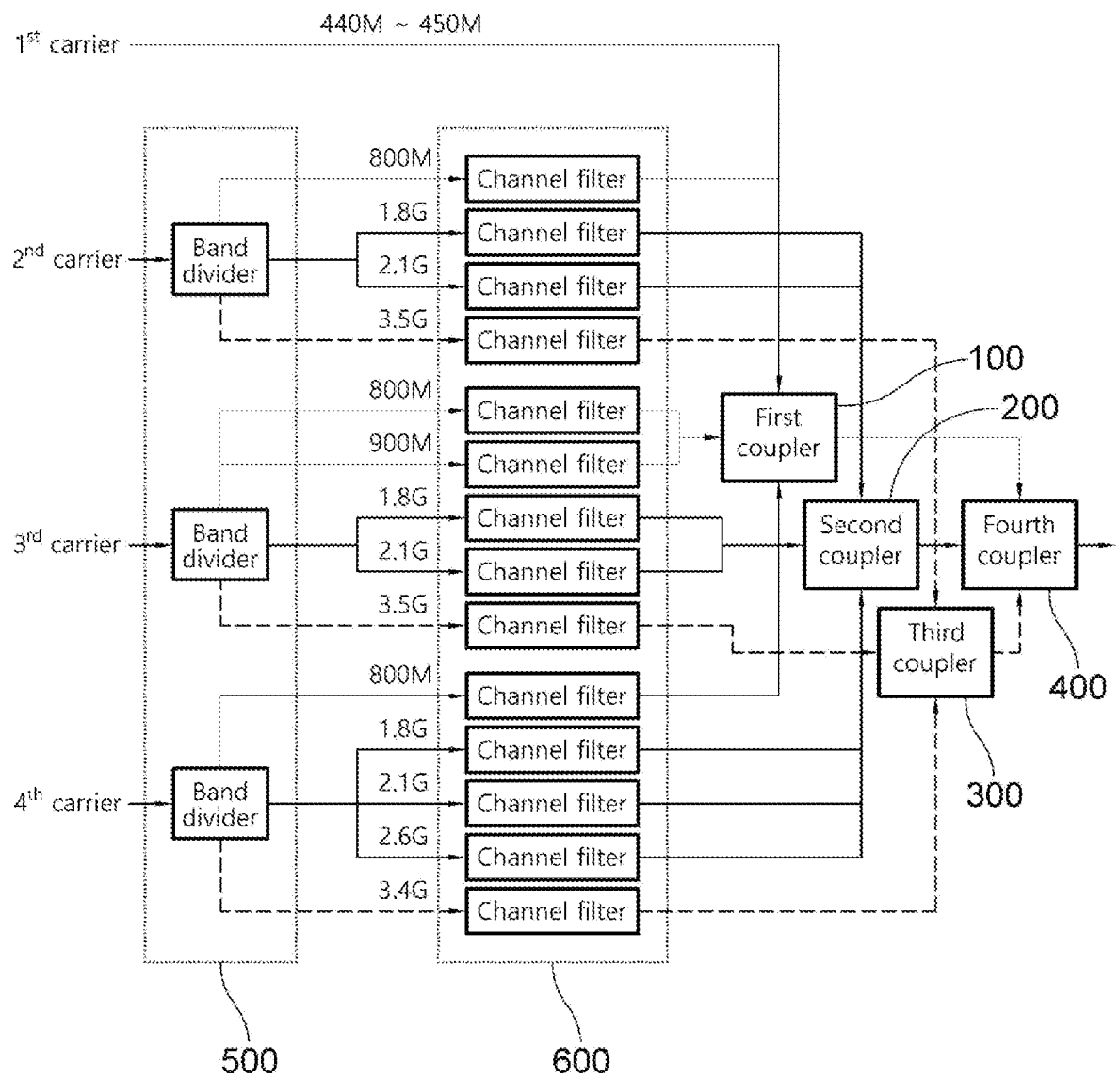
FIG. 5 is a block diagram showing a 5G common filter with excellent PIMD performance using a coupling method upon combining frequency bands in accordance with another example embodiment of the present invention.

FIG. 5 is a block diagram showing a 5G common filter with excellent PIMD performance using a coupling method upon combining frequency bands in accordance with another example embodiment of the present invention.

As shown in FIG. 5, the filter in accordance with another example embodiment of the present invention comprises: a band divider 500 for dividing a frequency band serviced by at least one carrier, which is lower than a first specified value, into a low frequency band, dividing a frequency band between the first specified value and a second specified value into a medium frequency band and dividing a frequency band which is higher than the second specified value into a high frequency band; a channel filter 600 for filtering out channels for output of the band divider 500; a first coupler 100 for using common poles for combining at least two low frequencies for output of the channel filter 600; a second coupler 200 for using common poles for combining at least two medium frequencies for output of the channel filter 600; a third coupler for using common poles for combining at least two high frequencies for output of the channel filter 600; and a fourth coupler for using striplines for combining outputs of the first coupler 100, the second coupler 200 and the third coupler 300.

For example, in case of a first carrier, the bandwidth of the frequency used for firefighting which is 440 MHz-450 MHz may be accessed. If SKT as a second carrier, the frequency bandwidth of CDMA, WCDMA and LTE which are 825 MHz-838 MHz, 870-883 MHz-915 MHz, 1715 MHz-1734 MHz, 1810 MHz-1829 MHz, 1931 MHz-1959 MHz and 2121 MHz-2149 MHz, and also 3620 MHz-3700 MHz (5G) may be accessed. In addition, if a third carrier is KT, the bandwidth for transmission and reception of CDMA/WCDMA/LTE which are 814 MHz-823 MHz, 859-868 MHz, 904 MHz-915 MHz, 949 MHz-960 MHz, 1736 MHz-1755 MHz, 1831 MHz-1850 MHz, 1961 MHz-1980 MHz, 2151 MHz-2170 MHz, and 3520 MHz-3580 MHz (5G) may be accessed. Besides, the signals of a fourth carrier LGU+ may be accessed.

As an example, the first specified value may be set as 1 GHz and the second specified value may be set as 3 GHz. In addition, as another example, the first specified value and the second specified value may be set to be the same value, i.e., 1 GHz or 2 GHz to divide only low or high frequency to combine.

In the present invention, if there are a lot of frequency band signals to combine, it may be set to use common poles if the difference between frequency bands is the specified value or less and to use striplines if the difference between frequency bands exceeds the specified value. By using the mixed methods, it is possible to improve PIMD performance while saving the space.

Figure 6:
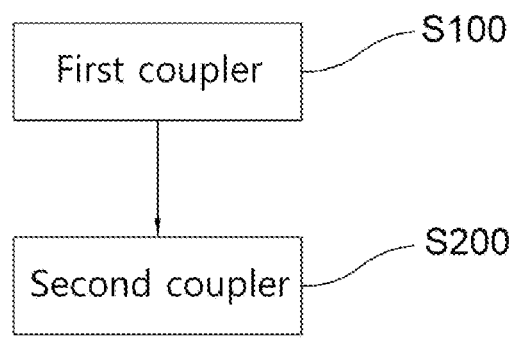
FIG. 6 is a flowchart showing a 5G common filtering method with excellent PIMD performance using a coupling method upon combining frequency bands in accordance with one example embodiment of the present invention.

FIG. 6 is a flowchart showing the 5G common filtering method with excellent PIMD performance using a coupling method upon combining frequency bands in accordance with one example embodiment of the present invention.

As seen in FIG. 6, the method may comprise steps of: combining a first band signal and a second band signal in a first coupler 100 at S100; and combining output of the first band coupler 100 and a third band signal in a second coupler 200 at S200. At the time, if a frequency interval between the first band signal and the second band signal exceeds a specified value, the first coupler 100 may be constructed with stripe lines while the second coupler 200 is constructed with common poles; and if a frequency interval between the first band signal and the second band signal is less than the specified value, the first coupler 100 may be constructed with common poles while the second coupler 200 is constructed with stripe lines.

To transmit frequencies of multiple carriers with different frequency bands such as 800 MHz, 900 Mhz, 1.8 GHz, 2.1 GHz, 3.5 GHz, etc. including 5G to one antenna, outputs of base stations or repeaters of carriers need to be band-combined.

At the time, frequencies of multiple carriers sometimes may be adjacent to each other or sometimes may not. In particular, when different adjacent signals are band-combined, this may cause PIMD, which may create interference between carriers. As seen above, in the present invention, to solve such problem, the performance of PIMD between different adjacent frequency bands may be improved by using a common pole method.

While the common pole method has a disadvantage of taking a lot of space to implement, a stripline coupling method is to couple striplines simply on a Printed Circuit Board (PCB). Therefore, the latter method shows poor performance of PIMD between different adjacent frequency bands but takes less space.

In addition, in case of the stripline coupling method, the occurrence of PIMD between different frequency bands, which are far away by more than a specified value, may be ignored. Therefore, it is more effective to use striplines for combining different frequency band signals which are far away by more than a specified value.

Accordingly, as shown above, the present invention has an effect of improving the PIMD performance while saving space by using band-coupling methods: the common pole combining method which is performed if a frequency interval between the first band signal and the second band signal is the specified value or less and the stripline coupling method which is performed if a frequency interval between the first band signal and the second band signal exceeds the specified value.

As mentioned above, the filter and the filtering method in accordance with the present invention have an advantage of combining and transmitting outputs of multiple carriers to an antenna by improving the PIMD performance and also improving the PIMD performance of common couplers by changing coupling methods depending on the signals of the frequency band signals of multiple carriers including 5G.

What has been mentioned above includes one or more example embodiments. Of course, it can be understood that all available combinations of components or methods may be described in order to explain the aforementioned example embodiments but those skilled in the art may additionally add, combine and replace a variety of example embodiments. Accordingly, the explained example embodiments include the intentions of what is claimed is as attached and all alternatives, variations and alternations within the scope.

What is claimed is:

1. A 5G common filter with passive intermodulation distortion (PIMD) performance using a coupling method upon combining frequency bands, comprising:
    a first coupler for combining a first band signal with a second band signal; and
    a second coupler for combining an output of the first coupler with a third band signal,
    wherein, if a frequency interval between the first band signal and the second band signal is a specified value or less, the first coupler is constructed with common poles and the second coupler is constructed with striplines, and
    wherein the common poles include:
        a frequency resonator to which frequency band signals flow;
        a signals-connecting wall where the frequency band signals are combined; and
        a connecting unit to which the combined frequency band signals are transmitted to an antenna.

2. The filter of claim 1, wherein, if the frequency interval between the first band signal and the second band signal exceeds the specified value, the first coupler is constructed with the striplines and the second coupler is constructed with the common poles.

3. The filter of claim 2, wherein the common poles are capacitors for combining at least two frequency band signals.

4. The filter of claim 2, wherein the striplines are used on a PCB pattern for combining at least two frequency band signals.

5. The filter of claim 1, wherein the common poles are capacitors for combining at least two frequency band signals.

6. The filter of claim 1, wherein the signals-connecting wall includes:
 a base for connecting the frequency resonator and the connecting unit; and
 an upper extending portion which is extended to an upper side of the base and is placed at a distance from the frequency resonator and at a distance from the connecting unit.

7. The filter of claim 6, wherein the signals-connecting wall performs impedance matching for the frequency band signals based on a height (H), a width (W) and a separation distance (d) of the upper extending portion.

8. The filter of claim 1, wherein the striplines are used on a PCB pattern for combining at least two frequency band signals.

9. A 5G common filter with passive intermodulation distortion (PIMD) performance using a coupling method upon combining frequency bands, comprising:
 a band divider for dividing a frequency band serviced by at least one carrier, which is lower than a first specified value, into a low frequency band, dividing a frequency band between the first specified value and a second specified value into a medium frequency band and dividing a frequency band which is higher than the second specified value into a high frequency band;
 a channel filter for filtering out channels for an output of the band divider;
 a first coupler for combining two or more low frequencies with common poles for an output of the channel filter;
 a second coupler for combining two or more medium frequencies with common poles for the output of the channel filter;
 a third coupler for combining two or more high frequencies with common poles for the output of the channel filter; and
 a fourth coupler for combining the outputs of the first, second and third couplers with striplines.

10. The filter of claim 9, wherein the common poles are capacitors for combining at least two frequency band signals.

11. The filter of claim 9, wherein the common poles include:
 a frequency resonator to which frequency band signals flow;
 a signals-connecting wall where the frequency band signals are combined; and
 a connecting unit to which the combined frequency band signals are transmitted to an antenna.

12. The filter of claim 11, wherein the common poles include:
 a base for connecting the frequency resonator and the connecting unit; and
 an upper extending portion which is extended to an upper side of the base and is placed at a distance from the frequency resonator and at a distance from the connecting unit.

13. The filter of claim 12, wherein the signals-connecting wall performs impedance matching for the frequency band signals based on a height (H), a width (W) and a separation distance (d) of the upper extending portion.

14. The filter of claim 9, wherein the striplines are used on a PCB pattern for combining at least two frequency band signals.

* * * * *